United States Patent [19]

Frutschi et al.

[11] Patent Number: 5,557,921
[45] Date of Patent: Sep. 24, 1996

[54] POWER PLANT

[75] Inventors: Hans U. Frutschi, Riniken; Hans Wettstein, Fislisbach, both of Switzerland

[73] Assignee: ABB Management AG, Baden, Switzerland

[21] Appl. No.: 414,740

[22] Filed: Mar. 31, 1995

[30] Foreign Application Priority Data

May 2, 1994 [DE] Germany ............ 44 15 315.5

[51] Int. Cl.[6] ............................................. F02C 3/30
[52] U.S. Cl. ................................. 60/39.53; 60/751
[58] Field of Search ........................ 60/39.05, 39.53, 60/39.55, 39.58, 39.59, 737, 751

[56] References Cited

FOREIGN PATENT DOCUMENTS

0462458A1  12/1991  European Pat. Off. .
1197280    7/1965   Germany .
2649938C2  11/1982  Germany .
4033710A1  5/1991   Germany .
2236145    3/1991   United Kingdom .

Primary Examiner—Louis J. Casaregola
Attorney, Agent, or Firm—Burns, Doane, Swecker & Mathis

[57] ABSTRACT

In a power plant which consists essentially of a compressor (2), of a downstream combustion chamber (6) and of a turbine (8) acting downstream of the combustion chamber, a first injector system (5a) is provided in the region of the outlet diffusor (4) of the compressor (2). A second injector system (5b) acts upstream of a burner (100) of the combustion chamber (6). The driving nozzles of these injectors are loaded by steam (10, 10a) from a waste-heat steam generator (13). In the first injector system (5a), precompressed air from the compressor (2) flows into the catching nozzle; a liquid fuel (112) flows upstream of the burner (100) into the catching nozzle of the second injector system (5b).

8 Claims, 4 Drawing Sheets

POWER PLANT

BACKGROUND OF THE INVENTION

1. Field of the Invention

The present invention relates to a power plant having steam driven injector system.

2. Discussion of Background

The final object of improvements to power plants is always to minimize the emissions of harmful substances from combustion and to maximize the efficiency of the plant. Attention is drawn, in this respect, to the gas-turbine groups of the newer generation which can furnish efficiencies of more than 35%. A further well-developed technique in power plants is to employ so-called combination plants. By this expression is meant the operative cooperation of a gas-turbine group with at least one downstream steam-turbine circuit, the exhaust gases from the gas-turbine process, which still have a relatively high energy potential, being conveyed into a waste-heat steam generator, in which the generation of the steam necessary for loading a steam turbine takes place. Such a waste-heat steam generator can be a single-pressure or mixed-pressure appliance. It is possible, furthermore, to equip the waste-heat steam generator with additional firing. According to the current state of the art, such a plant can furnish efficiencies of well above 55%. It is obvious that efforts are aimed at developing further these fossil fueled power plants, firstly with a view to a better utilization of the fossil reserves and secondly in light of the fact that, from the predetermined platform, any technological advance, by leverage, makes a difference which is out of all proportion in economic terms. In the case of gas-turbine groups, an appreciable fraction of the turbine power has to be expended in order to drive the compressor, and therefore an increase in the pressure drop in the gas turbine, leading per se to a higher efficiency yield of the plant, is to be achieved by a higher compression of the working air in the compressor and consequently provides little or nothing in terms of the end result, for the positive power from the turbine is lost in the form of an increased absorption of the shaft power by the compressor.

EP-A1-0,462,458 disclosed a method for increasing the compressor-related pressure drop of the gas turbine of a power-generating machine. In this method, the circuit consists of a gas-turbine group and of a downstream waste-heat steam generator. An injector takes effect immediately upstream of the combustion chamber, and the air precompressed in the compressor flows through the suction nozzle of said injector. The driving nozzle of this injector is loaded by at least some of the steam occurring in the waste-heat steam generator, with the result that the compressor air is further compressed, this taking place without taking up a fraction of power from the gas turbine. This orientation affords the sought-after increase in efficiency, with the proviso that combustion takes place in the combustion chamber by means of a gaseous fuel. If, in contrast, a liquid fuel is employed, it is necessary to adopt additional auxiliary measures with regard to the gasification of this fuel, and these largely nullify again the resulting increase in efficiency arising from the further compression of the air via an injector. A simple injection of a liquid fuel by atomization does not provide the low NOx values, such as are desired today. Nor does an admixture of steam assist here to the desired extent.

SUMMARY OF THE INVENTION

The invention is intended to remedy this. Accordingly, the object of the invention is, in a power plant of the type initially mentioned, to provide a novel treatment of the liquid fuel in the interests of low-NOx combustion without a loss of efficiency.

The essential advantages of the invention are to be seen in that the treatment of the liquid fuel is also carried out on the same principle as that adopted for the further compression of the air. According to this principle, the gas-turbine group is provided with a second injector, through the catching nozzle of which the liquid fuel flows in order to operate a burner. The driving nozzle of this injector is likewise loaded with some of the steam occurring in the waste-heat steam generator. As a result of this procedure, action is taken on the liquid fuel in two respects: on the one hand, the shearing forces and the internal turbulence in the injector ensure that the liquid fuel is atomized to the smallest possible droplets; on the other hand, the temperature of the steam ensures that these smallest possible fuel droplets are evaporated extremely quickly, in such a way that the burner downstream of the injector is fed with an optimum mixture of fuel and steam, the mixture corresponding to a lean fuel gas. In this configuration, there can preferably be provided as burner a mixing burner, the combustion air of which has undergone the already assessed further compression via the other injector. The parallel connection of the two steam-loaded injectors makes it possible that, on the one hand the increase in efficiency remains unaffected and, on the other hand, the combustion chamber can be operated with a premixing burner and with liquid fuel, the emissions of harmful substances, particularly the NOx emissions, being minimized.

If the combustion chamber of the gas-turbine group is designed as an annular combustion chamber, an advantageous arrangement in respect of further compression of the air in the injector is obtained. This injection involves providing, in the region of the outlet diffusor of the compressor, a continuous belt of injectors which are fed via a ring conduit placed outside the housing of the annular combustion chamber.

Advantageous and expedient developments of the solution according to the invention for achieving the object are defined in the further claims.

Exemplary embodiments of the invention are illustrated and explained in more detail below by means of the drawings. All the elements not necessary for an immediate understanding of the invention are omitted. The direction of flow of the various media is indicated by arrows. Like elements are provided with the same reference symbols in the various figures.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
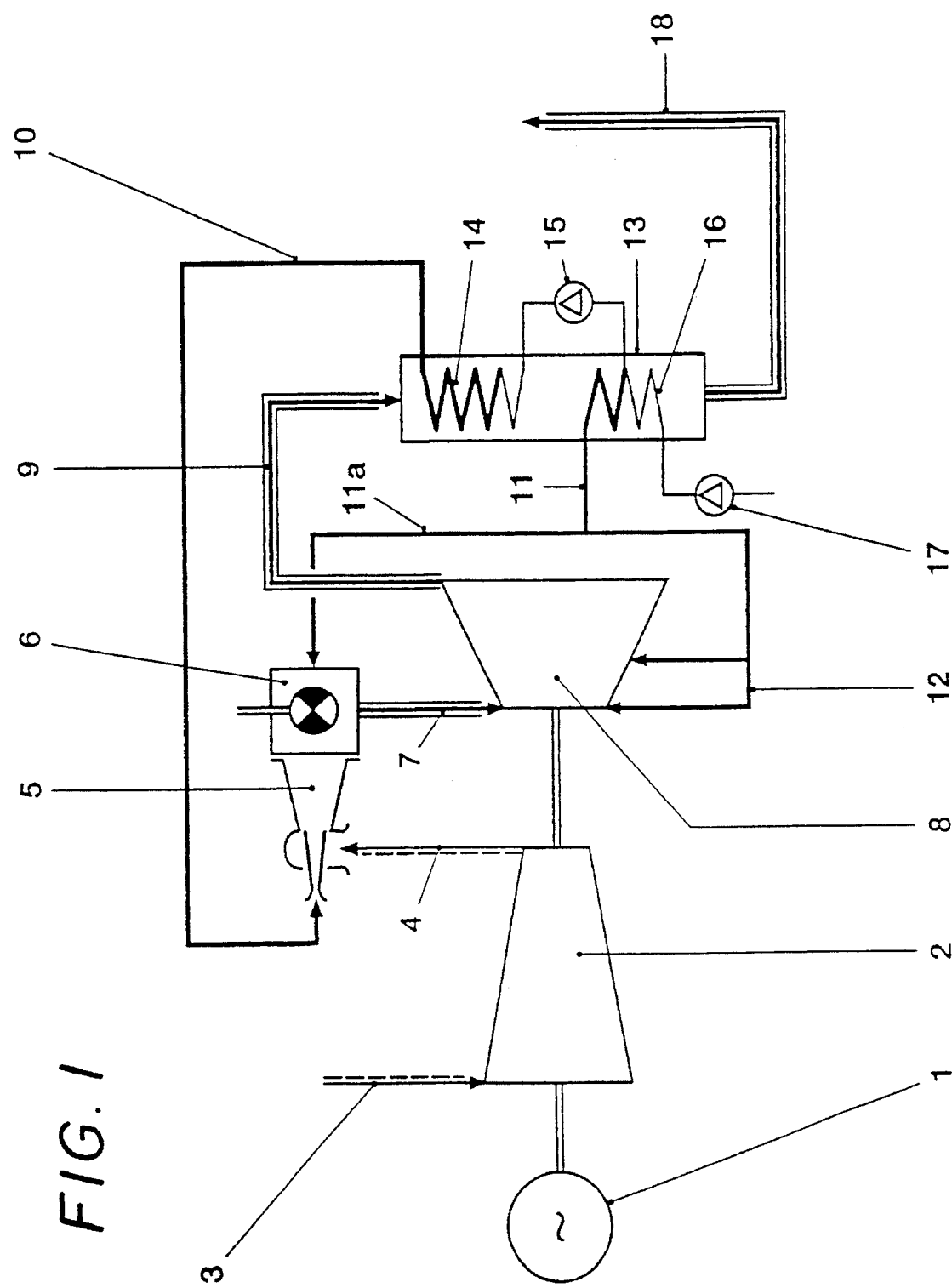
FIG. 1 shows a circuit in a diagrammatic representation of a gas-turbine group with a waste-heat steam generator and injector.
Figure 2:
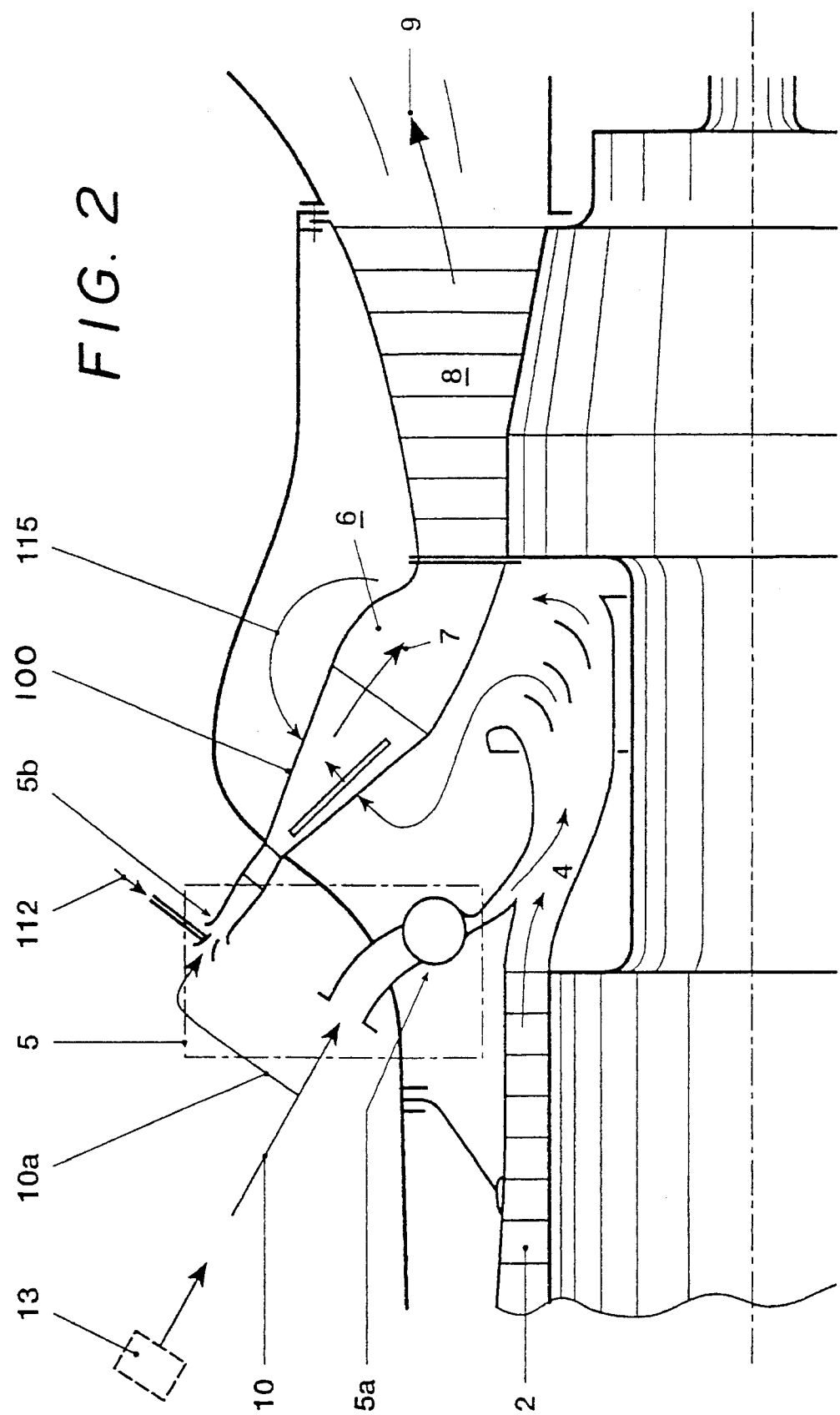
FIG. 2 shows an embodiment of the gas turbine with an annular combustion chamber, with the compressor and turbine arranged on the shaft, and with various injectors.

Referring now to the drawings, wherein like reference numerals designate identical or corresponding parts throughout the several views, FIG. 1 shows a gas-turbine group, into which a waste-heat steam generator 13 and an injector system 5 are integrated. The two last-mentioned assemblies are connected operatively to the gas-turbine group. The gas-turbine group as an independent unit consists in terms of components of a generator 1, a compressor 2, a combustion chamber 6 and a turbine 8. The sucked-in air 3 is compressed in the compressor 2 with the effect of precompression and then passes into the effective range of the injector system 5 as early as in the outlet diffusor 4 of the compressor 2. The injector system 5 and the specific design of the combustion chamber 6 and of its burner are explained in more detail under FIGS. 2 to 6. The combustion air treated thermally in said combustion chamber 6 loads the downstream turbine 8 as hot gases 7. The gas-turbine exhaust gases 9 are fed to the waste-heat steam generator 13, where their energy is further utilized. A high-pressure steam 10 is generated in a high-pressure steam-generating part 14 from the thermal energy released from these exhaust gases 9 and is fed to the injector system 5 and there loads the respective corresponding driving nozzle. Since this is a dual-pressure waste-heat steam generator 13, a low-pressure steam 11 is prepared in a further low-pressure steam-generating part 16. Some of this steam 11a is fed, for example, to the combustion chamber 6 and can be used there for further minimizing the NOx emissions. Another portion of the steam 12 coming from the low-pressure steam-generating part 16 can be employed as a coolant for the turbine 8. The cooled exhaust gases are then blown off into the open as smoke gases 18 via a flue. A first feed-water pump 17 ensures that the medium is forced into the waste-heat steam generator 13, whilst a second feed-water pump 15 ensures the conveyance of the medium between the low-pressure and the high-pressure steam-generating part. Reference is made to FIG. 2 for the effect of such a circuit with regard to the use of the high-pressure steam 10. The following explanations are also appropriate here: because a high-pressure steam is used for loading the injector system 5, the exhaust gases 9 from the turbine 8 cannot be utilized sufficiently in the corresponding steam-generating part 14. This first stage is therefore advantageously followed by the low-pressure steam-generating part 16, already mentioned above, the steam 11 of which, as likewise mentioned briefly above, is fed to the turbine 8 as a coolant 12 and/or, against an excessive NOx emission, as a moderator medium 11a to the combustion in the combustion chamber 6. This low-pressure steam 11 naturally also contributes to increasing the power and efficiency. This circuit according to FIG. 1 can, of course, be designed as a combination plant, in that a portion of steam from the waste-heat steam generator 13 loads a downstream steam turbine not shown. Such an arrangement can be advantageous in conjunction with additional firing in the exhaust-gas conduit 9, at the latest in the waste-heat steam generator 13 itself. Finally, the waste-heat steam generator can be equipped with further pressure stages and the plant thus be optimized. Steam of even lower pressure could, for example, be fed to the low-pressure part of the abovementioned steam turbine, as coolant for the last stages of the gas turbine, or be used for heating purposes.

The steam which can be applied to the injector system 5 does not necessarily have to originate from a waste-heat steam generator. As soon as steam is present in sufficient quality and quantity, it can be used for operating the injector system.

FIG. 2 shows the mode of operation of injectors 5a and 5b in the region of the combustion chamber 6 designed as an annular combustion chamber. Both the compressor 2 and turbine 8 are mounted on a common shaft. Immediately downstream of the compressor 2, in its outlet diffusor 4, the precompressed air is further compressed as a result of the effect of the injector 5a. The high-pressure steam 10 generated in the waste-heat steam generator 13 loads the driving nozzle of this injector 5a and causes the precompressed air from the compressor 2 to be further compressed, the outlet diffusor 4 acting here as a suction nozzle of the injector 5a. Combustion is thereby carried out at a higher pressure stage; the turbine 8 is loaded with a pressure gradient which could not be built up by means of the compressor 2 alone. Thus, the energy inherent in the steam generated in the waste-heat steam generator is better utilized, with the result that both the power and the efficiency experience an increase in comparison with the known plant having a simple steam blow-in. From an operational point of view, the effect of the injector 5a affords the advantage that, with an increasing steam flow 10, the pressure upstream of the turbine 8 rises, without the counterpressure of the compressor 2 increasing inadmissibly. A sufficiently large pumping margin of the compressor 2 is therefore always guaranteed. In the instance shown here, according to which the combustion chamber is an annular combustion chamber 6, a continuous belt of injectors is installed in the outlet diffusor 4. A portion 10a of steam is branched off from the steam feed 10 to the injector 5a and is fed to the driving nozzle of another injector 5b. This injector 5b is arranged upstream of a burner 100. A liquid fuel 112 flows into the suction nozzle of this injector 5b. As a result of this procedure, action is taken on the liquid fuel 112 in two respects: on the one hand, the shearing forces and internal turbulence in the injector 5b ensure that the liquid fuel 112 is atomized to the smallest possible droplets; on the other hand, the temperature of the steam 10a employed ensures that these smallest possible droplets are evaporated as quickly as possible, in such a way that an optimum mixture of fuel and steam is injected in the downstream burner 100, before said mixture mixes further with the combustion air 115. It is advantageous, here too, if the injectors 5b necessary for this purpose form a continuous belt.

Figure 3:
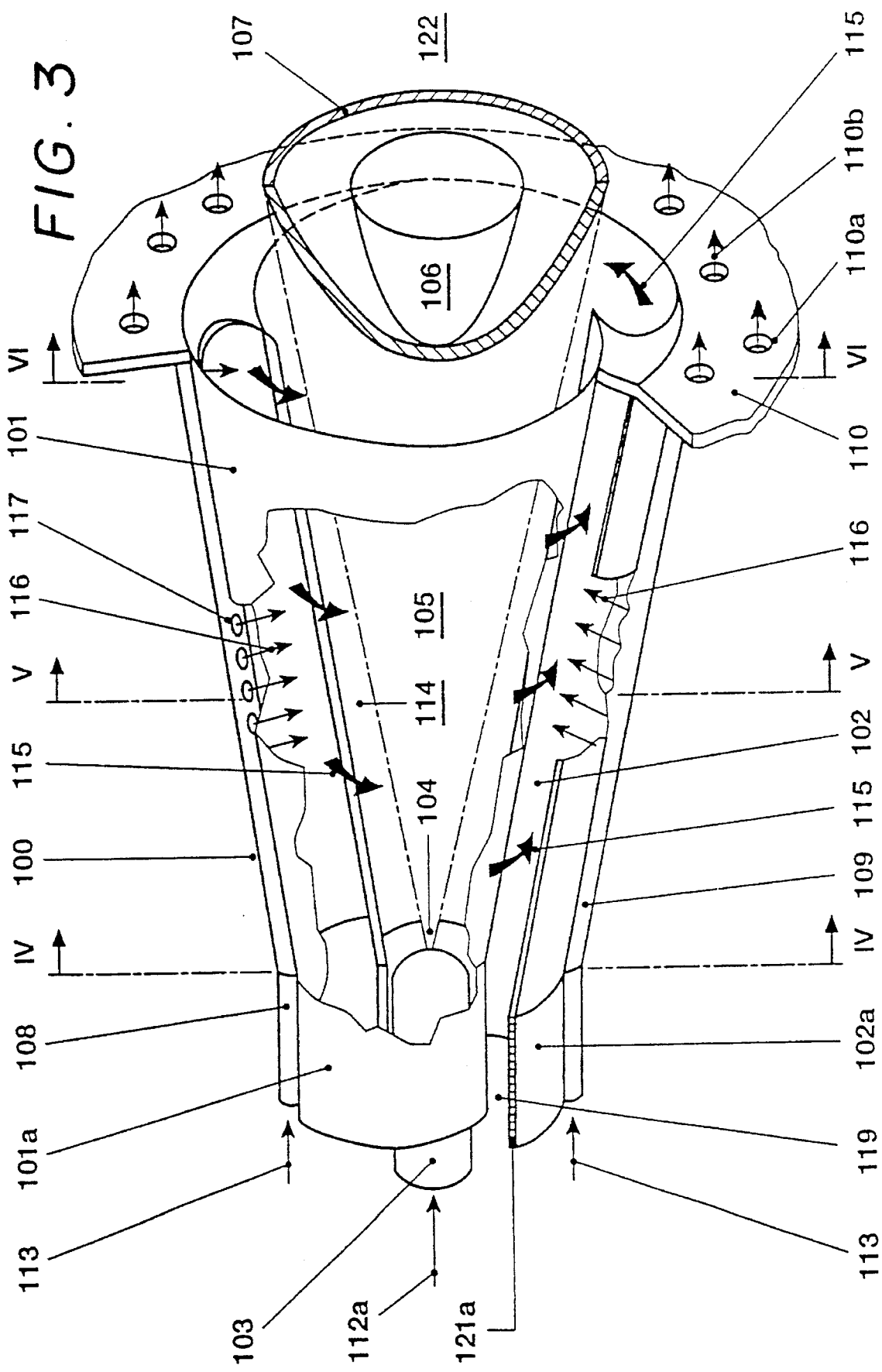
FIG. 3 shows a burner in the design as a "double-cone burner" in a perspective representation, cut away correspondingly.
Figure 4:
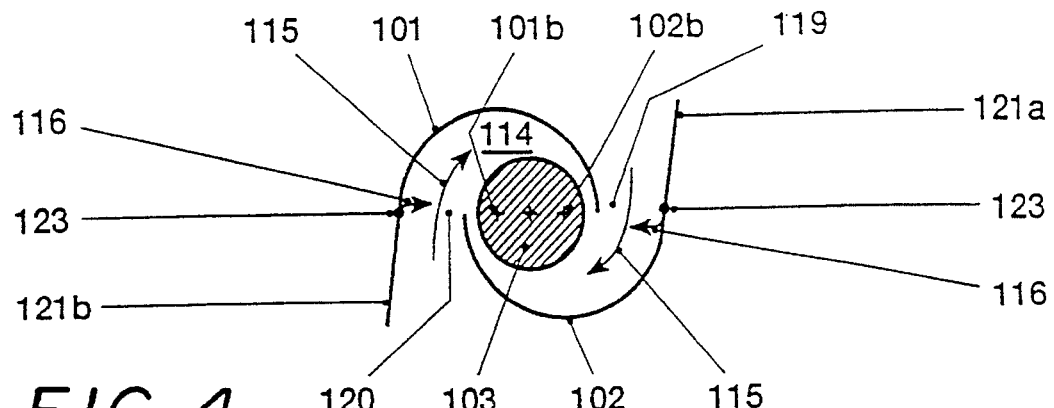
FIGS. 4–6 show corresponding sections through different planes of the burner.
Figure 5:
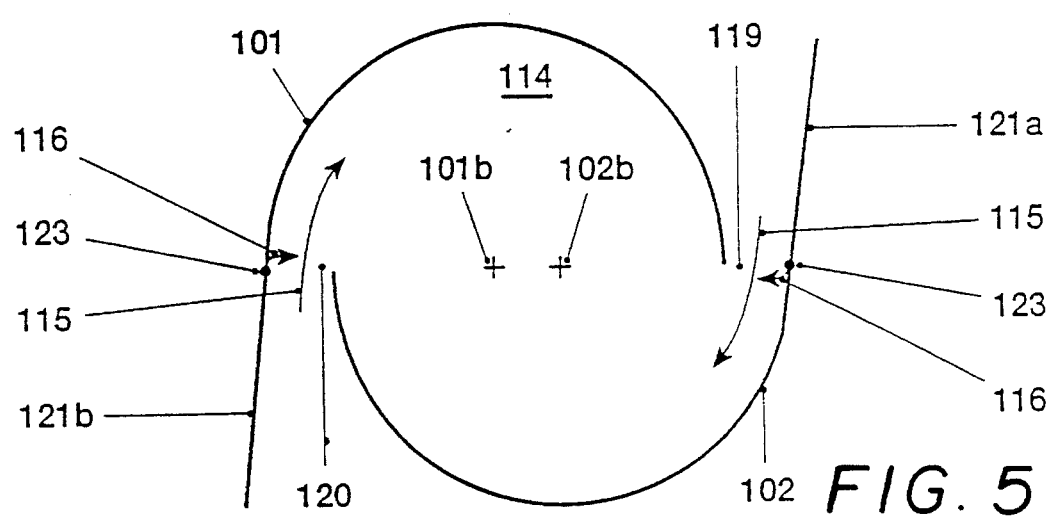
Figure 6:
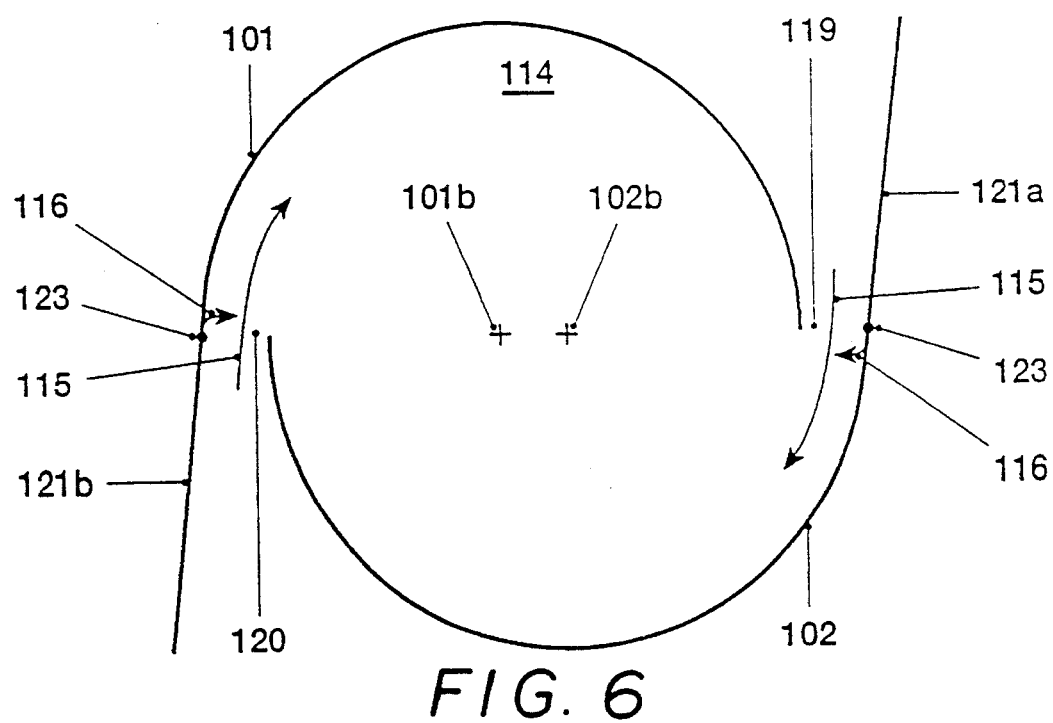

In order to understand the construction of the burner 100 better, it is advantageous if the individual sections according to FIGS. 4–6 are referred to at the same time as FIG. 3. Furthermore, to avoid making FIG. 3 needlessly complicated, the guide plates 121a, 121b shown diagrammatically according to FIGS. 4 to 6 have been merely indicated in it. The description of FIG. 3 refers below, where necessary, to the remaining FIGS. 4–6.

The burner according to FIG. 3 is a premixing burner and consists of two hollow conical part bodies 101, 102 which are nested one in the other so as to be mutually offset. The offset of the respective center axis or longitudinal axes of symmetry 201b, 202b of the conical part bodies 101, 102 relative to one another leaves free in each case on both sides, in a mirror-symmetrical arrangement, a tangential air-inlet slit 119, 120 (FIGS. 4–6), through which the combustion air 115 flows into the interior of the burner 100, that is to say into the conical cavity 114. The conical shape of the illustrated part bodies 101, 102 in the direction of flow has a specific fixed angle. Of course, depending on operational use, the part bodies 101, 102 can have in the direction of flow an increasing or decreasing amount of taper in a similar way to a trumpet or tulip. The two last-mentioned shapes are not shown in the drawing, since they can be readily understood by an average person skilled in the art. The two conical part bodies 101, 102 each have a respective cylindrical initial part 101a, 102a which likewise, in a similar way to the conical part bodies 101, 102, extend at an offset relative to one another, so that the tangential air-inlet slits 119, 120 are present over the entire length of the burner 100. Accommodated in the region of the cylindrical initial part is a nozzle 103, injection 104 of which coincides approximately with the narrowest cross section of the conical cavity 114 formed by the conical part bodies 101, 102. The injection capacity and the nature of this nozzle 103 depend on the predetermined parameters of the respective burner 100. Of course, the burner can be purely conical, that is to say be designed without cylindrical initial parts 101a, 102a. Furthermore, the conical part bodies 101, 102 each have a respective fuel conduit 108, 109 which are arranged along the tangential inlet slits 119, 120 and which are provided with injection orifices 117, through which preferably a gaseous fuel 113 is injected into the combustion air 115 flowing through there, as the arrows 116 are intended to represent. These fuel conduits 108, 109 are placed preferably at the latest at the end of the tangential inflow, before entering into the conical cavity 114, this being in order to obtain an optimum air/fuel mixture. On the combustion-space side 122, the outlet orifice of the burner 100 merges into a front wall 110, in which a number of bores 110a are present. The last-mentioned come into operation, as required, and ensure that diluent air or cooling air 110b is fed to the front part of the combustion space 122. Furthermore, this air feed ensures flame stabilization at the outlet of the burner 100. This flame stabilization becomes important when the aim is to promote the compactness of the flame as a result of radial flattening. The fuel supplied through the nozzle 103 is a mixture 112a of a liquid fuel 112 and steam 10 (see FIG. 2). This fuel/steam mixture 112a is injected into the conical cavity 114 at an acute angle. There thus forms from the nozzle 103 a conical fuel profile 105 which is enclosed by the tangentially inflowing rotating combustion air 115. In the axial direction, the concentration of the fuel/steam mixture 112a is continuously reduced by the inflowing combustion air 115 to ensure optimum mixing. If a gaseous fuel 113 is introduced via the orifice nozzles 117, formation of the fuel/air mixture takes place directly at the end of air-inlet slits 119, 120. As regards the injection of the fuel/steam mixture 112a, the optimum homogeneous fuel concentration over the cross section is achieved in the region of the bursting of the vortex, that is to say in the region of the backflow zone 106. Ignition takes place at the tip of the backflow zone 106. Only at this point can a stable flame front 107 occur. A blowback of the flame into the interior of the burner 100, as is latent to known premixing stages, remedy to which is sought there by means of complicated flame holders, is not to be feared here. If the combustion air 115 is additionally preheated or enriched with a returned exhaust gas, this gives sustained assistance to the evaporation of the liquid fuel 112 before the combustion zone is reached. The same considerations also apply when liquid fuels are fed via the conduits 108, 109. The design of the conical part bodies 101, 102 in respect of cone angle and the width of the tangential air-inlet slits 119, 120 is governed by narrow limits, so that the desired flow field of the combustion air 115 together with the flow zone 106 can be established at the outlet of the burner. It must be said, in general, that making the tangential air-inlet slits 119, 120 smaller displaces the backflow zone 106 further upstream, as a result of which, however, the mixture is then ignited earlier. It must be stated, nevertheless, that the backflow zone 106, once fixed, is per se stable in position, for the swirl rate increases in the direction of flow in the region of the conical shape of the burner 100. The axial velocity within the burner 100 can be varied by means of a corresponding feed, not shown, of an axial combustion-air stream. Furthermore, the construction of the burner 100 is preeminently suitable for varying the size of the tangential air-inlet slits 119, 120, with the result that a relatively large operational bandwidth can be covered without a variation in the overall length of the burner 100.

The geometrical configuration of the guide plates 121a, 121b now emerges from FIGS. 4 to 6. They have a flow-initiating function, and, according to their length, prolong the respective end of the conical part bodies 101, 102 in the onflow direction relative to the combustion air 115. The channelling of the combustion air 115 into the conical cavity 114 can be optimized by opening and closing the guide plates 121a, 121b about a center of rotation 123 located in the region of the entry of this channel into the conical cavity 114, this being necessary particularly when the original gap size of the tangential air-inlet slits 119, 120 is varied. Of course, these dynamic measures can also be provided as static measures, in that requisite guide plates form a fixed component with the conical part bodies 101, 102. The burner 100 can likewise also be operated without guide plates or other aids can be provided for this purpose.

Obviously, numerous modifications and variations of the present invention are possible in light of the above teachings. It is therefore to be understood that, within the scope of the appended claims, the invention may be practiced otherwise than are specifically described herein.

What is claimed as new and desired to be secured by Letters Patent of the United States is:

1. A power plant, comprising:
   at least one compressor,
   at least one combustion chamber having at least one burner,
   at least one turbine acting downstream of the combustion chamber,
   a steam generator connected to received exhaust gas from the at least one turbine,
   a first injector system mounted on an outlet diffusor of the compressor to further compress air from the compressor, a driving nozzle of the first injector system being connected to receive steam from the steam generator, and
   a second injector system disposed upstream of the burner of the combustion chamber to inject fuel into the burner, a driving nozzle of the second injector system being connected to receive steam from the generator.

2. The power plant as claimed in claim 1, wherein the second injector system includes a suction nozzle connected to a source of liquid fuel.

3. The power plant as claimed in claim 1, wherein the combustion chamber is an annular combustion chamber having a plurality of burners mounted on an end face.

4. The power plant as claimed in claim 1, wherein the burner comprises at least two hollow conical part bodies forming a conical interior space having a longitudinal direction corresponding to a direction of flow, longitudinal axes of symmetry of each part body being mutually offset so that adjacent walls of the part bodies form in the longitudinal direction tangential channels for a combustion-air stream into the interior space, and at least one fuel nozzle disposed in the conical interior space.

5. The power plant as claimed in claim 4, wherein further fuel nozzles are arranged in the region of the tangential channels along the longitudinal direction.

6. The power plant as claimed in claim 4, wherein the part bodies are shaped to widen conically at a fixed angle in the direction of flow.

7. The power plant as claimed in claim 4, wherein the part bodies are shaped to have an increasing amount of taper in the direction of flow.

8. The power plant as claimed in claim 4, wherein the part bodies are shaped to have a decreasing amount of taper in the direction of flow.

* * * * *